(12) United States Patent
Karmakar et al.

(10) Patent No.: US 11,580,471 B2
(45) Date of Patent: Feb. 14, 2023

(54) SYSTEM AND METHOD FOR DETERMINING AND IMPLEMENTING SALES CLUSTERS FOR STORES

(71) Applicant: Walmart Apollo, LLC, Bentonville, AR (US)

(72) Inventors: Somedip Karmakar, Kolkata (IN); Sourit Manna, Hooghly (IN); Gayatri Pal, Kodigehalli (IN)

(73) Assignee: Walmart Apollo, LLC, Bentonville, AR (US)

( * ) Notice: Subject to any disclaimer, the term of this patent is extended or adjusted under 35 U.S.C. 154(b) by 79 days.

(21) Appl. No.: 17/172,185

(22) Filed: Feb. 10, 2021

(65) Prior Publication Data
US 2021/0174284 A1 Jun. 10, 2021

Related U.S. Application Data

(63) Continuation of application No. 16/206,025, filed on Nov. 30, 2018, now abandoned.
(Continued)

(30) Foreign Application Priority Data

Dec. 28, 2017 (IN) .............................. 201741046978

(51) Int. Cl.
*G06Q 10/06* (2012.01)
*G06Q 10/08* (2012.01)
(Continued)

(52) U.S. Cl.
CPC ..... *G06Q 10/06315* (2013.01); *G06Q 10/087* (2013.01); *G06Q 30/02* (2013.01); *G06Q 30/0204* (2013.01); *G06Q 50/28* (2013.01)

(58) Field of Classification Search
CPC ...................... G06Q 10/06315; G06Q 10/087
See application file for complete search history.

(56) References Cited

U.S. PATENT DOCUMENTS

| 7,386,519 B1 | 6/2008 | Delurgio |
| 7,979,299 B1 | 7/2011 | Mehta |
| (Continued) | | |

FOREIGN PATENT DOCUMENTS

| CA | 3018381 A1 * | 10/2017 | ............ B25J 19/022 |
| CA | 3018381 A1   | 10/2017 | |
| (Continued) | | | |

OTHER PUBLICATIONS

Yingru Li and Lin Liu, Assessing the Impact of Retail Location on Store Performance: A Comparison of Wal-Mart and Kmart Stores in Cincinnati, 2012, Applied Geography, vol. 32, pp. 591-699 (Year: 2012).*

(Continued)

*Primary Examiner* — Amanda Gurski
(74) *Attorney, Agent, or Firm* — Fitch, Even, Tabin & Flannery LLP

(57) ABSTRACT

Initial sales cluster is divided by the control circuit into a plurality of velocity buckets. Subsequently, each velocity bucket is divided into a plurality of micro-clusters. The micro-clusters are defined according to demographic information or store characteristic information. A importance score and a performance score for each of the micro-clusters is determined. An optimal sales cluster and a corresponding optimal planogram for each retail store in each micro-cluster are determined based upon the importance score and the performance score.

18 Claims, 10 Drawing Sheets

Related U.S. Application Data

(60) Provisional application No. 62/636,913, filed on Mar. 1, 2018.

(51) Int. Cl.
   *G06Q 30/02*      (2012.01)
   *G06Q 50/28*      (2012.01)
   *G06Q 10/0631*    (2023.01)
   *G06Q 30/0204*    (2023.01)
   *G06Q 10/087*     (2023.01)

(56) References Cited

U.S. PATENT DOCUMENTS

| | | |
|---|---|---|
| 8,103,538 B2 | 1/2012 | Bamberg |
| 8,666,976 B2 | 3/2014 | Merz |
| 8,838,469 B2 | 9/2014 | Bottom |
| 9,256,832 B2 | 2/2016 | Shim |
| 9,336,302 B1 * | 5/2016 | Swamy ............... G06F 16/248 |
| 9,785,953 B2 | 10/2017 | Desal |
| 10,503,788 B1 * | 12/2019 | Kumar ............... G06Q 30/0201 |
| 2007/0112618 A1 | 5/2007 | Krneta |
| 2007/0288296 A1 | 12/2007 | Lewis |
| 2008/0052302 A1 | 2/2008 | Dolley |
| 2008/0294996 A1 * | 11/2008 | Hunt ............... G06Q 30/02 707/999.102 |
| 2010/0228604 A1 | 9/2010 | Desai |
| 2010/0318403 A1 * | 12/2010 | Bottom ............... G06Q 30/0202 706/54 |
| 2011/0238461 A1 | 9/2011 | Mulukutla |
| 2012/0278091 A1 | 11/2012 | Yaseen |
| 2012/0317059 A1 | 12/2012 | Joshi |
| 2013/0090988 A1 | 4/2013 | Moore |
| 2014/0058781 A1 | 2/2014 | Padmanabhan |
| 2014/0344118 A1 | 11/2014 | Parpia |
| 2016/0055495 A1 | 2/2016 | Qin |
| 2016/0297611 A1 | 10/2016 | Williams |
| 2016/0304281 A1 * | 10/2016 | Elazary ............... B65G 1/0492 |
| 2017/0148084 A1 | 5/2017 | Axelsson |
| 2017/0323376 A1 | 11/2017 | Glaser |
| 2019/0205806 A1 | 7/2019 | Karmakar |

FOREIGN PATENT DOCUMENTS

| | | |
|---|---|---|
| GB | 2583291 | 10/2020 |
| WO | 2019133323 | 7/2019 |
| WO | 2019133337 | 7/2019 |

OTHER PUBLICATIONS

Dréze, X., et.al, Shelf Management and Space Elasticity, 1994, Journal of Retailing, vol. 70, Issue 4, pp. 301-326 (Year: 1994).*
USPTO; U.S. Appl. No. 16/205,604; Office Action dated Jul. 30, 2021; (pp. 1-10).
International Search Report and Written Opinion of PCT/US2018/065980, dated Mar. 26, 2019, p. 1-13.
International Search Report and Written Opinion of PCT/US2018/066209, dated Mar. 14, 2019, p. 1-15.
PCT; App. No. PCT/US2018/065980; International Preliminary Report on Patentability dated Jul. 9, 2020.
PCT; App. No. PCT/US2018/066209; International Preliminary Report on Patentability dated Jul. 9, 2020.
USPTO; U.S. Appl. No. 16/205,604; Office Action dated Feb. 13, 2020; (pp. 1-18).
USPTO; U.S. Appl. No. 16/205,604; Office Action dated Nov. 12, 2020; (pp. 1-19).
USPTO; U.S. Appl. No. 16/206,025; Notice of Allowance dated Nov. 10, 2020; (pp. 1-11).
USPTO; U.S. Appl. No. 16/206,025; Office Action dated Feb. 14, 2020; (pp. 1-24).
USPTO; U.S. Appl. No. 16/205,604; Office Action dated May 5, 2021; (pp. 1-10).

\* cited by examiner

FIG. 8

Sales 1 (802) — 810:
S1V1M1 (*), S1V1M2, S1V1M3, S1V1M4 (*), S1V2M1, S1V2M2, S1V2M3 (*), S1V2M4 (*), S1V3M1, S1V3M2, S1V3M3 (*), S1V3M4, S1V3M5, S1V3M6 (*), S2V1M1 (*), S2V1M2, S2V1M3, S2V1M4, S2V1M5 (*), S2V2M1, S2V2M2, S2V2M3 (*), S2V2M4, S2V2M5, S2V2M6 (*), S2V3M1 (*), S2V3M2, S2V3M3, S2V3M4, S2V3M5, S2V3M6

812 markers indicated at S1V1M4, S1V2M3, S1V2M4, S1V3M6

Sales 2 (804)

Sales 3 (806) — 810:
S3V1M1 (*), S3V1M2, S3V1M3, S3V1M4, S3V1M5 (*), S3V1M6 (*), S3V2M1, S3V2M2, S3V2M3, S3V2M4, S3V2M5, S3V2M6, S3V3M1, S3V3M2, S3V3M3, S3V3M4, S3V3M5, S4V1M1, S4V1M2 (*), S4V1M3 (*), S4V1M4 (*), S4V2M1, S4V2M2, S4V2M3, S4V3M1, S4V3M2, S4V3M3

812 marker indicated at S3V1M5

Sales 4 (808)

SYSTEM AND METHOD FOR DETERMINING AND IMPLEMENTING SALES CLUSTERS FOR STORES

CROSS-REFERENCES TO RELATED APPLICATIONS

This application is a continuation of U.S. application Ser. No. 16/206,025, filed Nov. 30, 2018, which claims the benefit of Indian Provisional Application 201741046978, filed Dec. 28, 2017, and U.S. Provisional Application No. 62/636,913, filed Mar. 1, 2018, all of which are incorporated herein by reference in their entireties.

TECHNICAL FIELD

These teachings relate to clustering retail stores into groups and, more specifically, to assigning optimal clusters to these groups.

BACKGROUND

Retail stores typically have millions of items that can be organized into thousands of categories. The items are arranged in patterns or configurations relative to each other in the store. The arrangements are made to preferably to maximize sales of the products. Each store may have a demand pattern that reflects the choices made by customers in the nearby locality, their demographics, psychographics, geographical preferences, and overall and local trends.

The store layout and arrangement of the products is often captured in a planogram. When very few stores are involved (e.g., a single store or two stores) a unique planogram may be assigned to each store. However, assigning a unique planogram for each store (or each store category combination) is not practical for large numbers of stores and/or for stores that are spread over large geographical areas. For example, it is difficult to implement such a system over large number of stores because supplying, staffing, and arranging items according to a different pattern in each store would be difficult and/or costly to accomplish.

BRIEF DESCRIPTION OF THE DRAWINGS

The above needs are at least partially met through the provision of approaches that determine optimal sales clusters for retail stores, particularly when studied in conjunction with the drawings, wherein:

FIG. 8 comprises a diagram as configured in accordance with various embodiments of these teachings;

DETAILED DESCRIPTION

Figure 1:
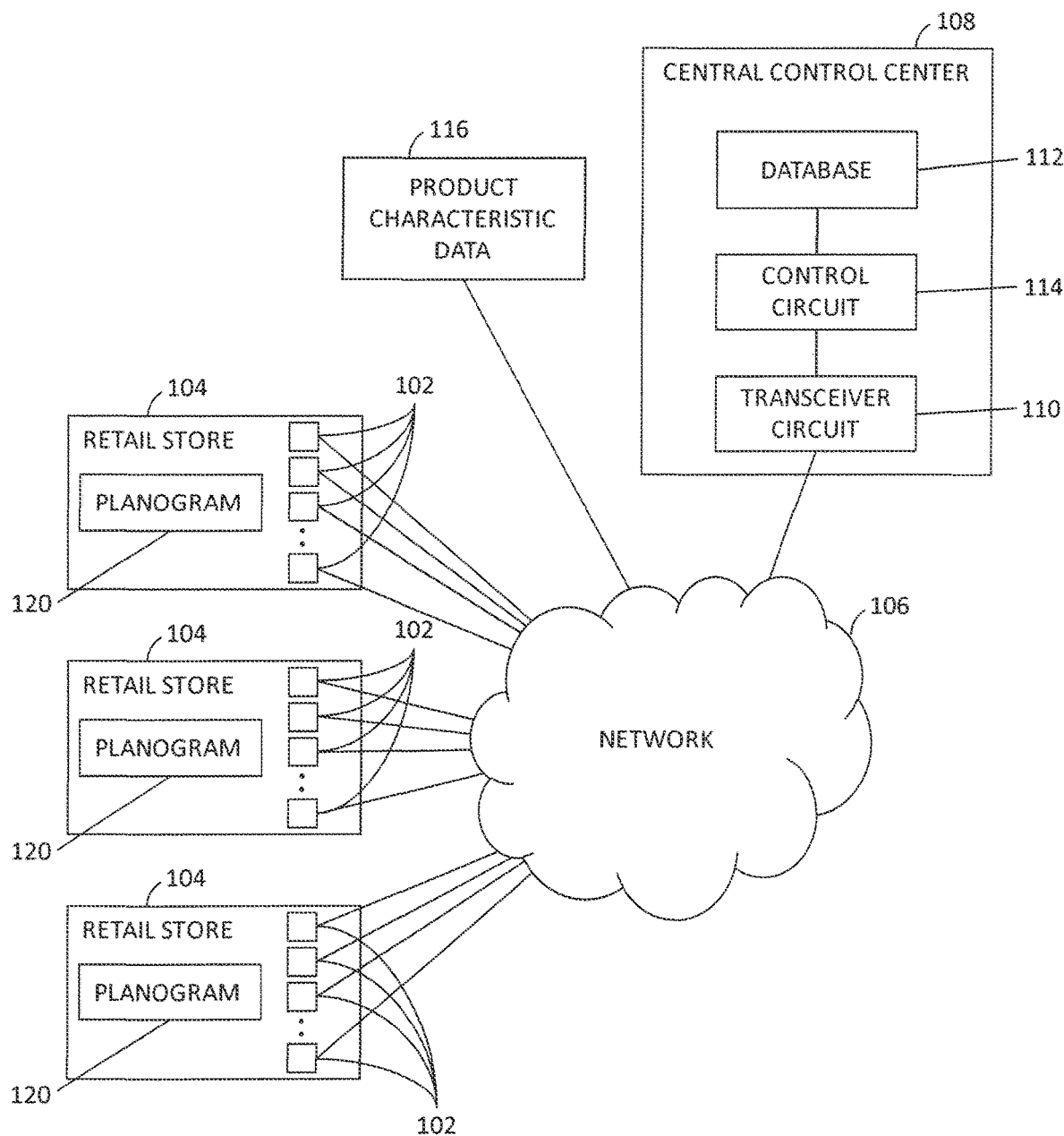
FIG. 1 comprises a diagram of a system as configured in accordance with various embodiments of these teachings.

Generally speaking, a multi-stage store clustering technique is implemented that utilizes varied and multiple dimensions of data (e.g., demand purchase patterns, transactional and store health indicators, and customer demographic and psychographic information) to determine retail store clustering arrangements. Association analysis of the items in a category is used to generate groups of items which are perceived similarly by customers. In aspects, the first stage of store clustering results in the creation of initial sales (or demand-based) clusters, which are created based on the purchase pattern of these item groups.

Some of the approaches described herein use a combination of multiple center-based, hierarchical, and specialized iterative approaches that automatically choose the best algorithm and the optimal number of clusters without any subjective intervention. These approaches are also suitable for handling the variations of all types categories and applicable to stores of any country. The demand-based clustering approaches described herein are flexible in capturing the different variants of demand metrics such as units, dollars, utilization of rest of market and competitor demand, and are easily customizable to account for seasonal and irregular demand spikes.

In aspects, some stores are initially filtered out of the clustering arrangement, which may have noise in the demand pattern and may skew the cluster formation. These stores are later classified into other or new demand clusters based on the customer demographics and/or store health metrics, to mention two examples.

In other aspects, some of the stores that are not performing as per expectation are moved to different demand clusters. The new demand clusters provide a better match for the demographics of the customers in those stores.

In still other aspects, the store clustering process is tied to a mechanism which provides customized forward-looking recommendations. The recommendations improve a store's revenue or footfall, as well as customer satisfaction. These approaches subdivide each demand cluster based upon the volume, velocity, store health metrics and demographics to identify the stores which are in crucial need of improvement. An inter-cluster regression mechanism provides the recommendation, for example, to change item facings and/or the variety of items present in the store to increase the store's performance.

In other aspects, an optimal store clustering solution is provided that accomplishes optimized localization of assortment across a large number of retail stores. For each category combination, the optimal product grouping hierarchy is decided based on a combination of item association, substitutability and product attributes. From the multiple hierarchy levels, a customized combination of product groups is determined automatically based on correlation analysis augmented by group sales share of the category.

The customer purchase pattern is calculated or determined at the selected group level using the current year store-item sales, and can potentially include future demand forecasts. The optimal number of clusters and the optimal clustering algorithm is chosen automatically from a large collection of various segmentation algorithms and a long range of cluster sizes, for example, using parallel computing. As a result, the first stage of demand-based clustering is performed for the optimal cluster size and optimal clustering algorithms.

Subsequently, aspects or characteristics of the clusters are computed at different dimensions to understand the unique features of each demand cluster. Aspects and performance of the clusters are investigated and compared across all clusters and/or against each other to identify over-performing and under-performing stores based on a combination of various store health metrics and weighted scores. The demand clusters may be further be divided into micro-clusters to better understand distinct patterns among the under-performing clusters based on a combination of volume, velocity, store health and customer demographics, to mention a few examples.

Some stores are initially excluded to remove noise from the purchase patterns, for example, very new stores or small-format stores. Also, some under-performing stores can be placed in a different cluster to understand the customer preferences. These are later reclassified into a suitable cluster based on store health and customer demographics.

Based on the above-mentioned steps, a store-cluster assignment is created. This may be overlaid with more local features like regional item preferences, and fixtures and footages to create the store-modular groupings with modular planograms for which the same assortment is planned.

At each cluster level, a recommendation model suggests the action plan in terms of modification of item variety and shelf space to increase the overall store performance. If there is a major change which is required for the store-category combination an alert will be sent to the store manager for changing the product placement and one to the replenishment manager for change in order quantity. Other examples of actions are possible.

Advantageously, the present approaches provide the optimal choice of cluster size and arrangement in an automatic process. The clustering may be based on several algorithms, and is suitable for all types of categories and markets.

In other aspects, the store localization is not only sales or demand-based, but considers the customer demographics or psychographics to make the assortment more customer facing. The present approaches do not force-fit existing demand patterns onto the stores, but, instead are dynamic, forward-looking, and multidimensional.

In many of these embodiments, a system that determines and implements optimal planograms in retail stores to maximize store performance includes a plurality of sales entry devices, a transceiver circuit, a database, and a control circuit.

The sales entry devices are configured to collect sales data at a plurality of retail stores. The transceiver circuit is disposed at a central processing center, and is configured to receive the sales data, and additionally receive product characteristic data for products stocked in the plurality of retail stores. The database is disposed at the central processing center, and is configured to store the sales data and the product characteristic data.

The control circuit is disposed at the central processing center. The control circuit is coupled to the transceiver circuit and the database and is configured to form initial sales clusters of retail stores from the plurality of retail stores according to one of a plurality of algorithms using the product characteristic data and the sales data. Each of the initial sales clusters include a subset of the plurality of retail stores. The selection is effective to maximize the compactness of the initial sales clusters and to minimize the total number of initial sales clusters. Each of the initial sales clusters are assigned an initial planogram.

The control circuit is configured to divide each initial sales cluster into a plurality of velocity buckets. Each of the velocity buckets relates to a velocity of product sales according to the sales data for retail stores in the velocity bucket.

The control circuit is configured to subsequently divide each velocity bucket into a plurality of micro-clusters. The micro-clusters are defined according to demographic information or store characteristic information.

The control circuit is configured to, using the sales data, determine an importance score and a performance score for each of the micro-clusters. The importance score indicates the relative ranking of a micro-cluster compared to other micro-clusters in accomplishing store performance goals. The performance score indicates the absolute operational performance of the retail stores in the micro-cluster in accomplishing the store performance goals.

The control circuit is configured to selectively determine an optimal sales cluster and a corresponding optimal planogram for each retail store in each micro-cluster based upon the importance score and the performance score. The optimal planogram is selected to maximize store performance.

The control circuit is configured to determine and implement an action based upon the optimal planogram. The action includes using a robot or human to stock the stores according to the optimal planogram. The action is communicated to the human or robot via the transceiver circuit.

In other aspects, the store performance goal may reflect a variety of different metrics. For example, the goal may be one or more of year-over-year sales trends, year-over-year category growth, market or customer penetration, and or category share of a department. Other examples are possible.

In other examples, the performance score and the importance score reflect differences between a micro-cluster average and a national average.

In one example, the optimal sales cluster is a newly created sales cluster with a newly created planogram. In another example, the optimal sales cluster is one of the initial sales clusters with the initial planogram for the initial sales cluster.

In still other examples, profile information concerning the initial sales clusters, or the micro-clusters is rendered to a user at a user interface.

In aspects, the performance score indicates that the micro-cluster is ideal in performance, over-performing, under-performing, or at-risk of under-performing, and the importance score indicates that the micro-cluster is significant or not significant. By one approach, when a micro-cluster is under-performing and significant, the optimal planogram is a newly created planogram. In another aspect, when a micro-cluster is over-performing and not significant, then the optimal planogram is the same as the original modular planogram of the sales cluster (i.e., the planogram is not changed).

In examples, the algorithms may be any number of different algorithms or approaches. For example, a K-means algorithm, a K-medoids algorithm, a Wards's Clustering algorithm, and/or a Convex Clustering algorithm may be used. Other examples are possible.

In others of these embodiments, an approach is provided that determines and implements optimal planograms in retail stores to maximize store performance. Sales data is collected at a plurality of sales entry devices at a plurality of retail stores. The sales data and product characteristic data for products stocked in the plurality of retail stores is received at a central processing center. The sales data and the product characteristic data is stored at a database at the central processing center.

At control circuit disposed at the central processing center, initial sales clusters of retail stores from the plurality of retail stores are formed according to one of a plurality of algorithms using the product characteristic data and the sales data. Each of the initial sales clusters includes a subset of the plurality of retail stores. The selection is effective to maximize the compactness of the initial sales clusters and to minimize the total number of initial sales clusters. Each of the initial sales clusters is assigned an initial planogram.

Each initial sales cluster is divided by the control circuit into a plurality of velocity buckets. Each of the velocity buckets relates to a velocity of product sales according to the sales data for retail stores in the velocity bucket Subsequently, each velocity bucket is divided into a plurality of micro-clusters by the control circuit. The micro-clusters are defined according to demographic information or store characteristic information.

Using the sales data, the control circuit determines an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals.

The control circuit selectively determines an optimal sales cluster and a corresponding optimal planogram for each retail store in each micro-cluster based upon the importance score and the performance score. The optimal planogram maximizes store performance. The control circuit determines an action based upon the optimal planogram. The action may be implemented by a human or robot. In examples, the action includes using a robot or human to stock the stores according to the optimal planogram.

In others of these embodiments, a system determines and implements optimal planograms in retail stores to maximize store performance. The system includes a plurality of retail stores. Shelving units are disposed in each of the plurality of retail stores. The shelving units are configured to display products to customers.

A plurality of automated vehicles or robots are deployed in the plurality of retail stores. A plurality of sales entry devices that are configured to collect sales data are deployed at the plurality of retail stores.

A transceiver circuit is disposed at a central processing center. The transceiver circuit is configured to receive the sales data, and additionally receive product characteristic data for products stocked in the plurality of retail stores.

A database is disposed at the central processing center. The database is configured to store the sales data and the product characteristic data.

A control circuit is disposed at the central processing center. The control circuit is coupled to the transceiver circuit and the database.

The control circuit is configured to form initial sales clusters of retail stores from the plurality of retail stores according to one of a plurality of algorithms using the product characteristic data and the sales data. Each of the initial sales clusters includes a subset of the plurality of retail stores. The selection is effective to maximize the compactness of the initial sales clusters and to minimize the total number of initial sales clusters. Each of the initial sales clusters is assigned an initial planogram.

The control circuit is configured to divide each initial sales cluster into a plurality of velocity buckets, which may be implemented as any appropriate data structure. Each of the velocity buckets relates to a velocity of product sales according to the sales data for retail stores in the velocity bucket.

The control circuit is configured to subsequently divide each velocity bucket into a plurality of micro-clusters. The micro-clusters are defined according to demographic information or store characteristic information.

The control circuit is configured to, using the sales data, determine an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals.

The control circuit is configured to selectively determine an optimal sales cluster and a corresponding optimal planogram for each retail store in each micro-cluster based upon the importance score and the performance score. The optimal planogram is selected to maximize store performance.

The control circuit is configured to determine and implement an action based upon the optimal planogram. The action includes using the automated vehicle or robot to stock the shelving units at the stores according to the optimal planogram. The action is communicated to the robot via the transceiver circuit. The stocking is accomplished by moving or rearranging products within the retail stores to the shelving units in the retail stores. The action also includes reconfiguring at least one of the shelving units in at least one of the plurality of retail stores.

Referring now to FIG. 1, a system that determines and implements optimal planograms in retail stores to maximize store performance includes a plurality of sales entry devices 102 at a plurality of retail stores 104, a network 106, a central processing center 108 (including a transceiver circuit 110, a database 112, and a control circuit 114). Automated vehicles (e.g., drones, automated ground vehicles) and robots are deployed at the stores 104. As described elsewhere herein, the automated vehicles and/or robots may be used to physically implement the planograms obtained according to the approaches described herein. The robots may be stationary or moveable through the retail stores 104 and include arms or other members that can secure and/or move products or adjust shelving units.

The sales entry devices 102 are configured to collect sales data at a plurality of retail stores. In examples, the sales entry devices 102 may be cash registers, scanners, or other types of devices that obtain sales data of products sold to customers in a retail store. The retail stores 104 are any type of retail store (or potentially wholesale distributor) that sell products or services to the public. The network 106 is any electronic communication network or combination of networks. The central processing center 108 is any centralized center at a central location such as a company headquarters.

The transceiver circuit 110 is disposed at the central processing center 108 and is configured to receive the sales data, and additionally receive product characteristic data 116 for products stocked in the plurality of retail stores 104. The transceiver circuit 110 may be any combination of computer hardware or software. The data 116 may be received from a variety of different sources such as the manufacturers, suppliers, or distributors of the various products.

The database 112 is any type of memory storage device. The database 112 is disposed at the central processing center 108, and is configured to store the sales data and the product characteristic data 116.

The control circuit 114 is disposed at the central processing center 108. The control circuit 114 is coupled to the transceiver circuit 110 and the database 112. It will be appreciated that as used herein the term "control circuit"

refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 114 may be configured (for example, by using corresponding programming stored in a memory as will be well understood by those skilled in the art) to carry out one or more of the steps, actions, and/or functions described herein.

In aspects, the control circuit 114 may be implemented as processing elements operated in parallel. These parallel processors implement virtual machines the execute the approaches described herein. These approaches increase the speed of cluster organization, in some cases, by many hours (e.g., 6 hours).

The control circuit 114 is configured to form initial sales clusters of retail stores from the plurality of retail stores 104 according to one of a plurality of algorithms using the product characteristic data and the sales data. In examples, the algorithms may be any number of different algorithms or approaches. For example, a K-means algorithm, a K-medoids algorithm, a Wards's Clustering algorithm, and/or a Convex Clustering algorithm may be used. Other examples are possible.

Each of the initial sales clusters includes a subset of the plurality of retail stores. The selection is effective to maximize the compactness of the initial sales clusters and to minimize the total number of initial sales clusters, each of the initial sales clusters being assigned an initial planogram.

In still other examples, profile information concerning the initial sales clusters, or the micro-clusters is rendered to a user at a user interface. In examples, the user interface may be a smartphone, personal computer, laptop, or tablet.

The control circuit 114 is configured to divide each initial sales cluster into a plurality of velocity buckets. Each of the velocity buckets relates to a velocity of product sales according to the sales data for retail stores in the velocity bucket. The velocity buckets may be implemented as any appropriate data structure.

The control circuit 114 is configured to subsequently divide each velocity bucket into a plurality of micro-clusters. The micro-clusters are defined according to demographic information or store characteristic information.

The control circuit 114 is configured to, using the sales data, determine an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals. In other examples, the performance score and the importance score reflect differences between a micro-cluster average and a national average.

In other aspects, the store performance goal may reflect a variety of different metrics. For example, the goal may be one or more of year-over-year sales trends, year-over-year category growth, market or customer penetration, and or category share of a department. Other examples are possible.

The control circuit 114 is configured to selectively determine an optimal sales cluster and a corresponding optimal planogram 120 for each retail store in each micro-cluster based upon the importance score and the performance score. The optimal planogram 120 is selected to maximize store performance. In one example, the optimal sales cluster is a newly created sales cluster with a newly created planogram. In another example, the optimal sales cluster is one of the initial sales clusters with the initial planogram for the initial sales cluster. The optimal planogram 120 may be formed according to planogram formation techniques that consider a store's traffic pattern, sales data, item size, or other item characteristics to mention a few examples.

In aspects, the performance score indicates that the micro-cluster is ideal in performance, over-performing, under-performing, or at-risk of under-performing, and the importance score indicates that the micro-cluster is significant or not significant. By one approach, when a micro-cluster is under-performing and significant, the optimal planogram 120 is a newly created planogram. In another aspect, when a micro-cluster is over-performing and not significant, then the optimal planogram is the same as the original planogram 120 of the sales cluster (i.e., the planogram is not changed). The planogram may be overlaid with more local features like regional item preferences, and fixtures and footages (to mention a few examples) to create a modular planogram.

The control circuit 114 is configured to determine and implement an action based upon the optimal planogram. The action includes using a robot or human to stock the stores 104 according to the optimal planogram 120. The action is communicated to the human or robot via the transceiver circuit 110. When a robot or automated vehicle is used, the robot may collect products from a storeroom, move products between shelves, adjust shelves, and move products within a shelf. The robot or autonomous vehicle may also adjust price information (e.g., price tags) or other advertising. The autonomous vehicle such as an aerial drone or an automated ground vehicle. The robots or automated vehicles may communicate with each other and coordinate their actions. For example, the robots or automated vehicles may determine or assign roles (e.g., one automated vehicle moves products from a backroom to the sales floor, while another places the product on the shelf).

Figure 2:
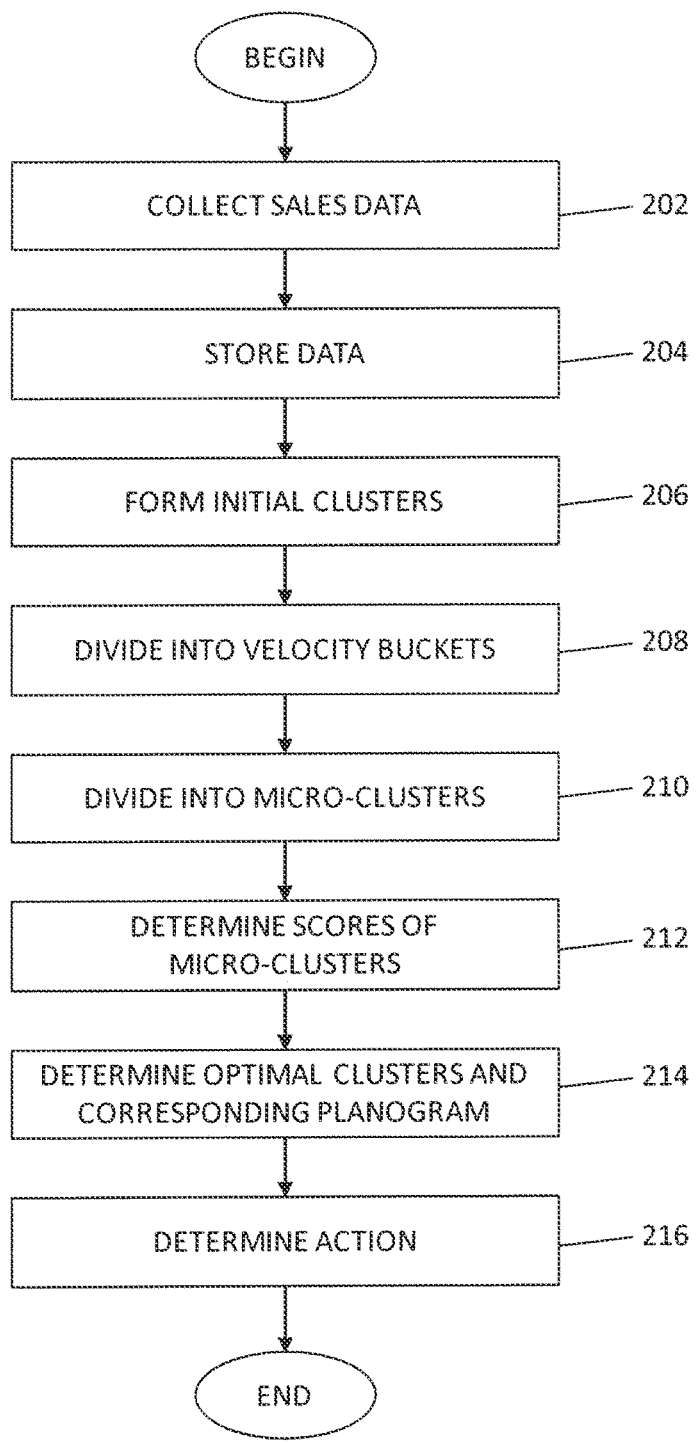
FIG. 2 comprises a flowchart as configured in accordance with various embodiments of these teachings.

Referring now to FIG. 2, an approach is provided that determines and implements optimal modular planograms in retail stores to maximize store performance is described.

At step 202, sales data is collected at a plurality of sales entry devices at a plurality of retail stores. The sales entry devices may be cash registers, scanners, smart phones (that have scanners) or any other similar type of device. The sales data and product characteristic data for products stocked in the plurality of retail stores is received at a central processing center. At step 204, the sales data and the product characteristic data is stored at a database at the central processing center. The database may be any type of memory storage device and the information may be stored as an appropriate data structure.

At step 206 and at control circuit disposed at the central processing center, initial sales clusters of retail stores from the plurality of retail stores are formed according to one of a plurality of algorithms using the product characteristic data and the sales data. Each of the initial sales clusters includes a subset of the plurality of retail stores. The selection is effective to maximize the compactness of the initial sales clusters and to minimize the total number of initial sales clusters. Each of the initial sales clusters is assigned an initial planogram.

In aspects, the items or products are grouped. The grouping of items is necessary so as to visualize the store-clusters easily with respect to profiling them as well as to determine distinctive features between them. The items are labelled at different level like a decision tree, substitutability measures, or the retail store's product attributes.

Final groups for each item are selected after doing a pairwise correlation analysis on the store level aggregated sales value of each level groups, which will reduce the noise of same sales pattern item occurrence in multiple groups. These final groups, which follow different hierarchy, are considered as final variables as one of the input for store-clustering where each item will reside only in one final group/variable.

Store level sales values for current year are calculated for each group as an aggregated value of each items in respective groups which eventually provides total sum of sales of items for each group which are basically now the variables for clustering process and acting as demand of that item group in that store, at a store level which are the observations of the clustering process. Then, each variable's value for every specific store are standardized with respect to the total store sales of that store. This calculation gives sales share of each item groups in that store.

The optimal choice of cluster size and clustering algorithms are then determined. In aspects, highly-correlated variables and variables with very less variance are removed and data is scaled/standardized.

Various compactness measures can also be used. For instance, compactness measures for clustering such as "silhouette measure", "Ratkowsky index", "Dunn index", "Krzanowski and Lai criterion", "Calinski and Harabasz index" may be calculated for different cluster sizes and aggregated after standardizing at cluster size level. Then, cluster size (with maximum of this measure) is recommended as the optimal cluster size, i.e. given the data this number of clusters should be optimum to extract or form the most compact and distinct clusters.

Example algorithms which are used for clustering with the optimal numbers of clusters include K-means algorithms, K-medoids (PAM) with Euclidean distance algorithms, K-medoids (PAM) with Manhattan distance algorithms, Ward's Hierarchical Clustering with Euclidean distance algorithms, Ward's Hierarchical Clustering with Manhattan distance algorithms, and Convex Clustering algorithms. In aspects, the algorithm that has maximum silhouette measure will be recommended for final clustering along with optimal number of clusters.

After clustering with recommended cluster size and cluster algorithm an initial cluster assignment for each store which are called demand or sales clusters. Different actions can be taken. For example, stores corresponding to different clusters are rendered and can be viewed in a map (e.g., a map of the United States) with different colors.

In other examples, item group level sales share for each cluster are aggregated and presented as the clusters profiles. This determination gives the main distinctive features of a specific cluster. Flags may be given for an item group in a specific cluster based on how far the item's sales share value varies from average value at a national scale.

In other aspects, indicators are given for the same to show their YoY sales share significantly high or low. In still other aspects, demographic profiles are shown for individual clusters, which allows a user to obtain which demographic features are significantly distinctive for a specific cluster. Store health comparisons and under-performing store detections may also be made.

For each store, various metrics can also be calculated. For instance, the category share of department may be determined. This metric is the ratio of category sales and department sales multiplied by ratio of number of categories of that department present in that store and total number of categories in that department.

Customer penetration may also be determined. This metric is the ratio of number of households bought from that category in that store and same bought from the department in that store.

The category YoY growth may also be calculated. This metric indicates how much growth the category made in current year compared to the last year in that store.

The YoY trend may additionally be determined. This metric indicates the difference between category YoY growth and department YoY growth.

The store health is determined by aggregating scaled values of above-mentioned metrics for each store. Aggregating store health for each store in a cluster gives a health metric for a specific cluster. Stores having lower percentile store health value are detected as under-performing stores.

At step 208, each initial sales cluster is divided by the control circuit into a plurality of velocity buckets. Each of the velocity buckets relating to a velocity of product sales according to the sales data for retail stores in the velocity bucket.

Subsequently at step 210, each velocity bucket is divided into a plurality of micro-clusters by the control circuit. The micro-clusters are defined according to demographic information or store characteristic information.

At step 212 and using the sales data, the control circuit determines an importance score and a performance score for each of the micro-clusters. The importance score indicates the relative ranking a micro-cluster compared to other micro-clusters in accomplishing store performance goals. The performance score indicates the absolute operational performance of the retail stores in the micro-cluster in accomplishing the store performance goals.

In order to manage the large number of micro-clusters (e.g., >50), the micro-clusters are scored on the basis of how significantly different it is with respect to the national average as well as the cluster average. To achieve this goal, the importance score and the performance score may be used.

In aspects, the importance score is a weighted average of the absolute relative changes of the store traits from the cluster average as well as national average multiplied by the variable importance. In other aspects, the performance score is a weighted average of the relative changes of the store traits from the cluster average as well as national average multiplied by the variable importance, whole multiplied by its velocity bucket index.

The variable importance is obtained from a Random forest model of the sales per footage on the store traits. Other examples are possible.

The micro-clusters identified as being significant on the basis of the importance score are selected for special focus, and the demographics for only these micro-clusters may be profiled.

On the basis of performance score, it can be determined whether the micro-cluster is an ideal or over-performing one or whether it is in risk or an under-performing one. If the micro-cluster is not significant on the basis of importance score or if it is over-performing, then it is suggested that the modular cluster for the stores belonging to these micro-clusters should be the same as the sales cluster to which they belong. If the micro-cluster is significant with respect to the importance score as well as an under-performing store, then a separate modular should be formed for these micro-clusters.

At step 214, the control circuit selectively determines an optimal sales cluster and a corresponding optimal planogram for each retail store in each micro-cluster based upon the importance score and the performance score. The optimal planogram maximizes store performance. The final planograms can be a combination of demand clusters or micro-clusters.

In examples, intra-cluster recommendation may be made. Once the stores are aligned to a demand cluster (or micro-cluster) actionable insights are provided to improve the overall store performance.

The independent variables considered in the model are the selected product group level horizontal facings share and the item penetration (or variety) of the store. Suitable data pre-processing is done with respect to multi-collinearity and outlier detection. A step-wise forward (or backward) linear (or non-linear) regression model is run with suitable regularization. The statistically significant variables are selected based on p-value, in one example.

The lower and upper confidence interval is given for the proportional change in sales amount for unit percentage change in the significant independent variables. For each cluster, the top relevant recommendations are given which will give the maximum increase in store sales performance.

Demographic reclassification for missing and under-performing stores may also be performed. For the initial demand based clustering, some stores are removed initially to reduce the noise in the purchase pattern data, for example, the stores which are opened after the starting date of the clustering period.

Some stores may be excluded from the clusters since they don't carry the entire assortment, e.g. for food and consumables, general merchandising stores can be excluded. The excluded stores need to be allocated some cluster for the assortment planning, but their demand pattern is not reliable. In aspects, these stores are re-classified to one of the existing demand or sales clusters (or micro-clusters) based on the store traits and customer demographics like age, income, ethnicity, etc. using an ensemble of Neural Network, Random Forest and Extreme Gradient Boosting models.

Since the demand clusters are based on past sales pattern, ever-changing customer purchasing patterns need not be captured in other ways. In aspects, the under-performing stores are re-classified to other demand clusters which match the similar customer profiles.

At step 216, the control circuit determines an action based upon the optimal planogram. The action may be implemented by a human or robot. The action includes using a robot, automated vehicle, or human to stock the stores according to the planogram. In examples, automated vehicles may move or adjust shelving units or other display units that hold products. This can include moving shelves, moving products, or both. Labels or other items on, attached to, or associated with the product may also be changed, replaced, exchanged or altered by the robots, automated vehicles, or humans. Automated vehicles can communicate with each or a central processing center to coordinate their actions. For example, one automated vehicle may be assigned or determine to move products, while another automated vehicle (in coordination with other automated vehicles may determine to physically adjust the shelving units.

Figure 3:
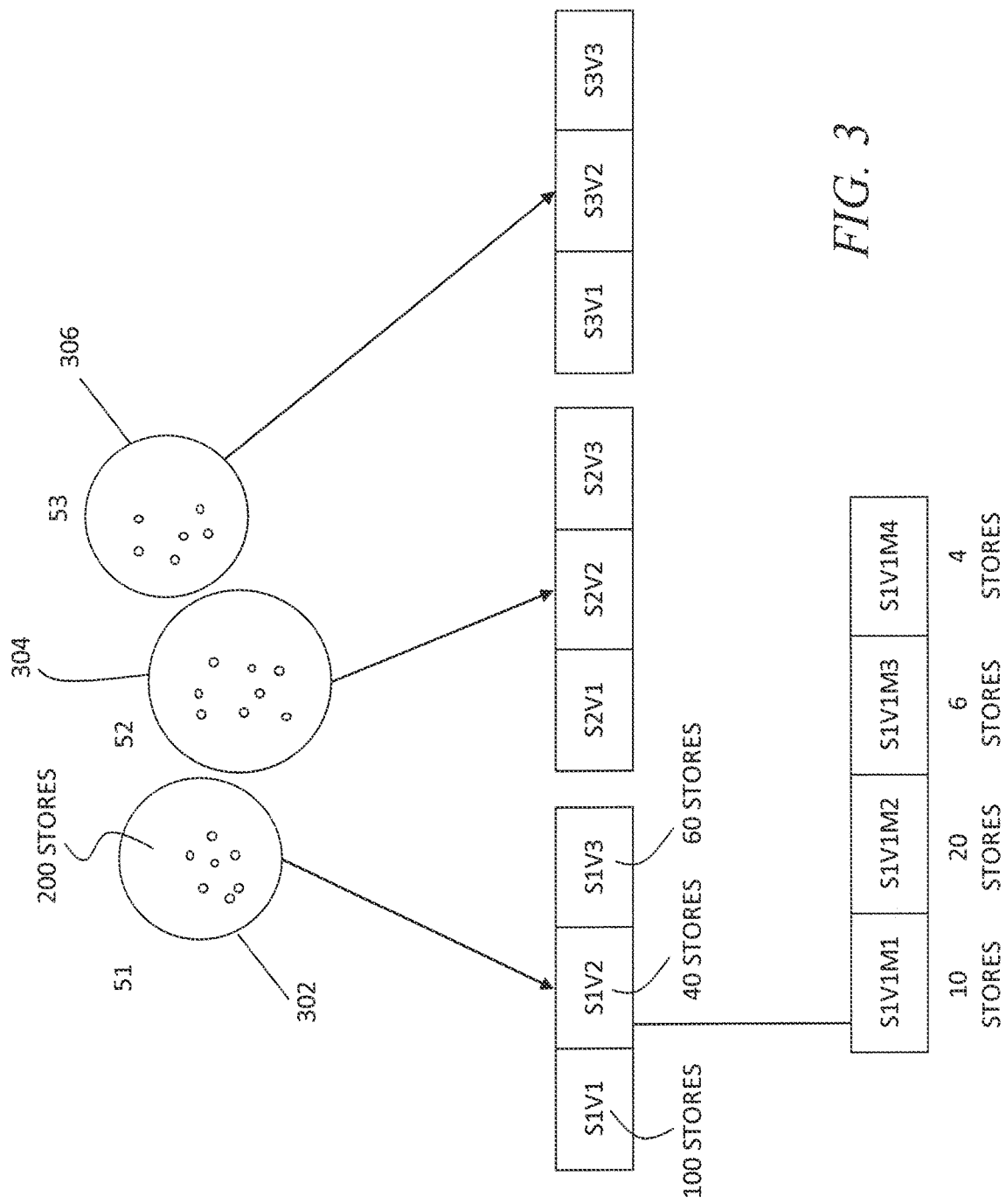
FIG. 3 comprises a diagram as configured in accordance with various embodiments of these teachings.

Referring now to FIG. 3, one example of an approach for determining optimal planograms is described. In this example, assume there are 1000 stores (e.g., spread across the United States). Based upon the automated choice of cluster size, the recommended cluster size is 3, yielding a first cluster 302 (S1) a second cluster 304 (S2), and a third cluster 306 (S3). S1 contains 200 stores, S2 has 500 stores and S3 has 300 stores.

Each of these clusters 302 (S1), 304 (S2), and 306 (S3) are subdivided into velocity buckets: low, medium and high velocity (V1,V2,V3). Consequently, there are 9 different sub-clusters: S1V1, S1V2, . . . S3V3.

Focusing on the cluster 302 (S1), S1V1 has 100 stores, S1V2 has 40 stores and S1V3 has 60 stores. Now, within each such sub-cluster, the micro-clusters are created using customer demographics, psychographics and other store health metrics. The number of micro-clusters may also be dynamically chosen to increase overall compactness. Suppose in this case, for S1V2 (i.e., Sales cluster 302 (S1) and medium velocity bucket) we have 4 micro-clusters, so these will be represented as S1V2M1 (10 stores), S1V2M2 (20 stores), S1V2M3 (6 stores) and S1V2M4 (4 stores).

This approach can give rise to large number of granular micro-clusters. So, the importance score is used to identify which micro-clusters need to be identified separately to build a separate modular planogram. The importance and performance scores are calculated at micro-cluster level only and not at a store level. Micro-cluster scoring can then take place.

Figure 4:
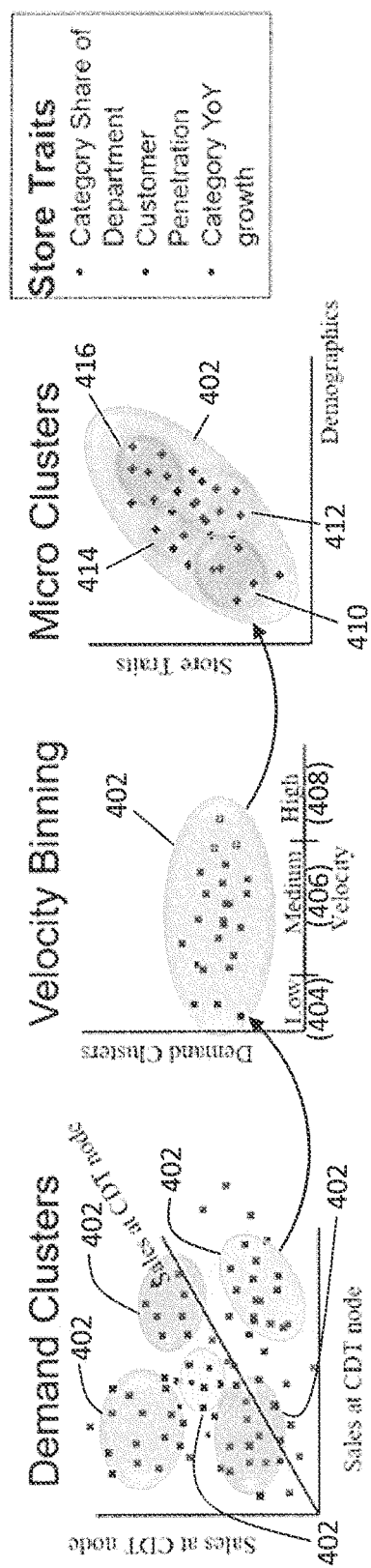
FIG. 4 comprises a diagram as configured in accordance with various embodiments of these teachings.
Figure 5:
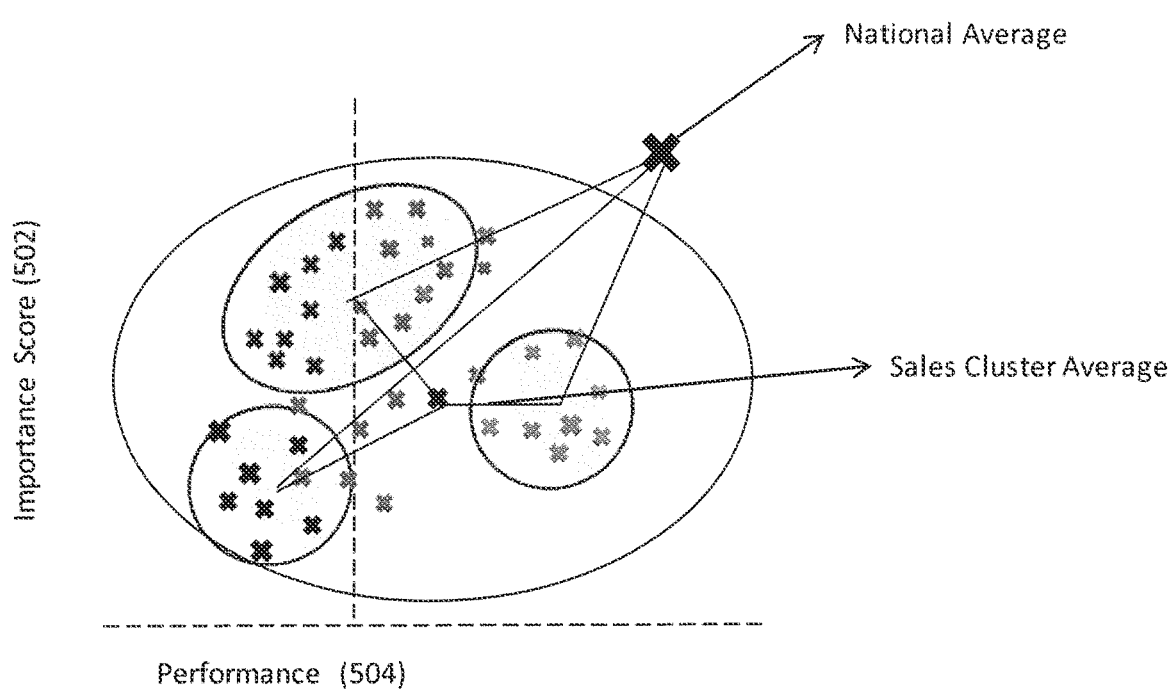
FIG. 5 comprises a diagram as configured in accordance with various embodiments of these teachings.
Figure 6:
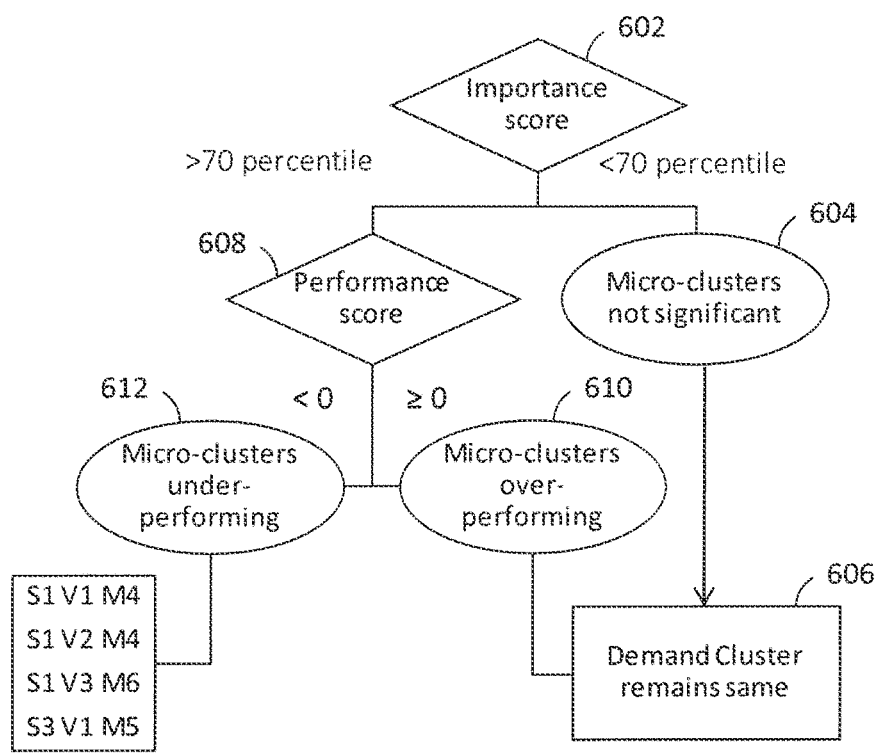
FIG. 6 comprises a flowchart as configured in accordance with various embodiments of these teachings.

Referring now to FIG. 4, FIG. 5, and FIG. 6, more cluster scoring details are described. In these examples, the clustered stores are organized into clusters 402 based on an item product hierarchy (e.g., a customer behavior tree or customer decision tree). In one specific example, dairy sales may include milk and cheese sales. Cheese sales can be broken further into sales of swiss, cheddar, and American cheese.

Each demand cluster is binned according to velocity score into three buckets 404, 406, and 408 as low, medium and high velocity buckets. For each demand cluster-velocity bucket combination, micro clusters are formed based on demographics and store traits. In this example, micro-clusters 410, 412, 414, and 416 are formed.

Referring now especially to FIG. 5 and in order to manage the large number of micro-clusters (e.g., >50), the micro-clusters are scored on the basis of how significantly different it is with respect to the national average as well as the cluster average.

An importance score 502 and performance score 505 are used. This approach specifically focuses on those micro-clusters which are significant on the basis of the importance score, and profile the demographics for these micro-clusters only.

On the basis of performance score, determination is made whether the micro-cluster is an ideal or over-performing one or whether it is in risk or an under-performing one. Further, if the micro-cluster is not significant on the basis of importance score or if it is over-performing then we suggest that the modular cluster for the stores belonging to these micro-clusters should be the same as the sales cluster to which they belong. But, if the micro-cluster is significant with respect to the importance score as well as an under-performing store then a separate planogram is formed for these micro-clusters.

The store-traits considered for forming the micro-cluster scores may include:
T1: Category Share of Department;
T2: Customer Penetration; and
T3: YoY trend.

The importance score is a weighted average of the absolute relative changes of the store traits from the cluster average as well as national average multiplied by the variable importance.

The performance score is a weighted average of the relative changes of the store traits from the cluster average as well as national average multiplied by the variable importance, whole multiplied by its velocity bucket index. The variable importance may be obtained from a Random forest model.

In one example, a micro-cluster is significant or in focus if its importance score exceeds the 70th percentile of all stores, i.e., the focus is on the top 30 percentile micro-clusters.

Also, a micro-cluster is over-performing if the performance score is positive and under-performing if it is negative.

Referring now to FIG. 6, one approach for assigning clusters is described. A performance score and an importance score have been obtained as described elsewhere herein.

At step 602, it is determined if the importance score places the micro-cluster above or (at or) below the $70^{th}$ percentile of other clusters, or the nation, or some other group. If at or below the $70^{th}$ percentile, the cluster is determined to be significant at step 604, and at step 606 the demand cluster remains the same.

If the importance score is above the $70^{th}$ percentile, a performance score for the micro-cluster is determined at step 608. If the score is 0 or positive, the micro-cluster is seen to be over-performing at step 610, and then 606 is executed as described above. If the score is negative, at step the micro-cluster is seen as under-performing. In this example, these are micro-clusters S1V1M4, S1V2M4, S1V3M4, and S3V1M5 (using the naming convention described above).

Figure 7:
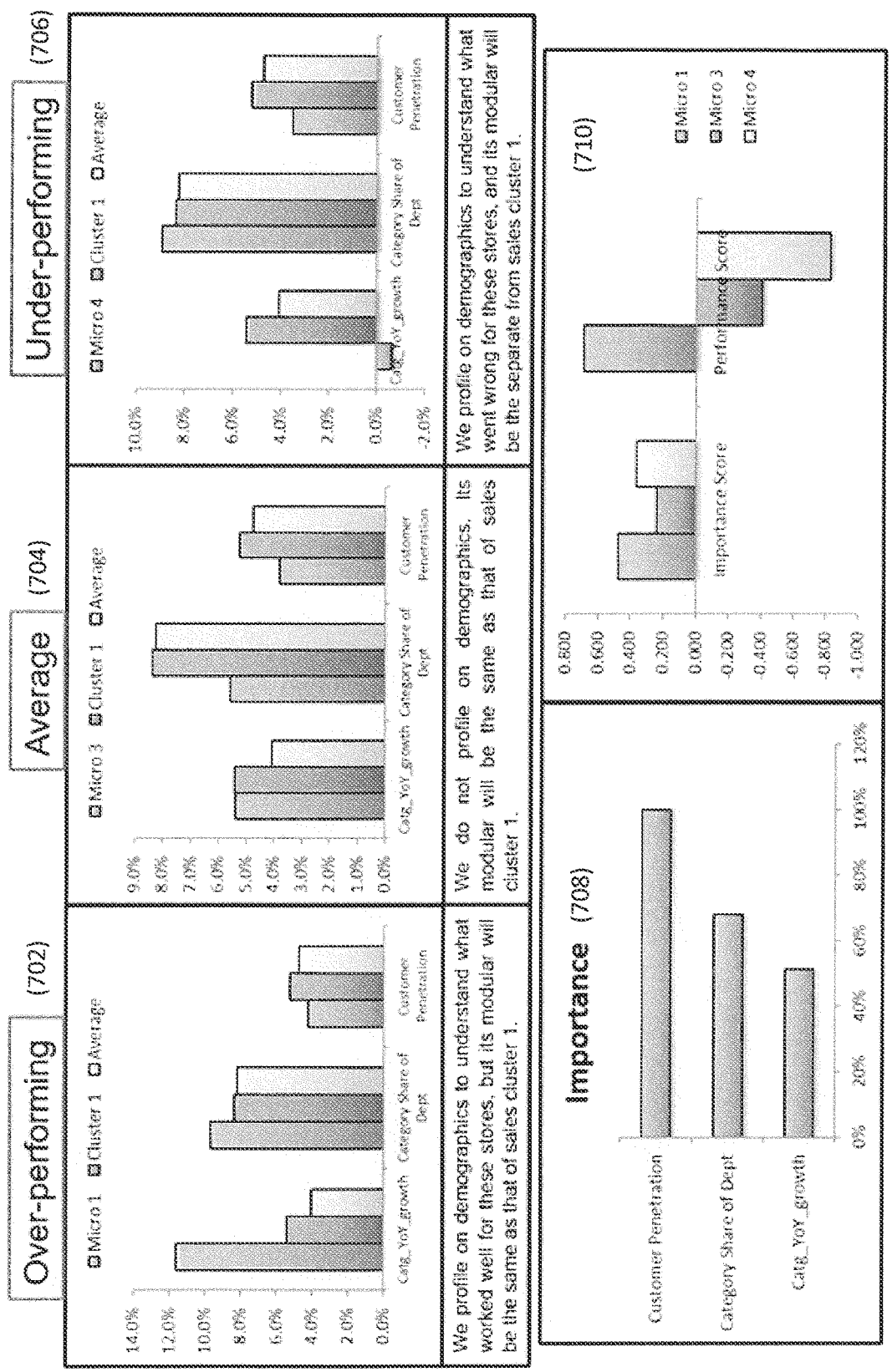
FIG. 7 comprises a diagram as configured in accordance with various embodiments of these teachings.

Referring now to FIG. 7, different displays can be suppled for the user. Various charts 702, 704, 706, 708, and 710 show different types of information to a user. These graphs may be rendered to a user visually on a screen, for example, on a personal computer, smartphone, tablet, or laptop.

The chart 702 shows overperforming stores in a first micro-cluster compared to a first sales cluster and an average. Profiles of the overperforming stores can be made according to demographics to understand what worked well for these stores. The planogram will be the same for the first micro-cluster as the first sales cluster.

The chart 704 shows average stores in a third micro-cluster compared to the first sales cluster and an average. Profiles of the overperforming stores need not be made on demographics since the performance is only average. The planogram will be the same for the first micro-cluster as the first sales cluster.

The chart 706 shows underperforming stores in a fourth micro-cluster compared to the first sales cluster and an average. Profiles of the underperforming stores can be made on demographics to understand what went wrong for these stores. The planogram will be the different and separate from the modular planogram of the first micro-cluster as the first sales cluster.

The chart 708 shows an importance score for one of the micro-clusters. The chart 710 shows comparisons between the importance and performance scores of the various micro-clusters.

Referring now to FIG. 8, approaches of how sales clusters can be divided into velocity buckets and then micro-clusters are described. As shown four sales clusters 802, 804, 806, and 808 are divided into various velocity buckets and micro-clusters as shown in column 810. Stores that are determined to be important or significant are shown with a (*) next to the store identifier. Important (significant) and underperforming stores 812 may be identified. Stores are identified by sales cluster, velocity bucket, and micro-cluster. Thus, S1V1M1 means that the store is in the first sales cluster, first velocity bucket, and first micro-cluster. This nomenclature is used in some of the other figures described herein (e.g., FIG. 3, FIG. 9, and FIG. 10).

Figure 9:
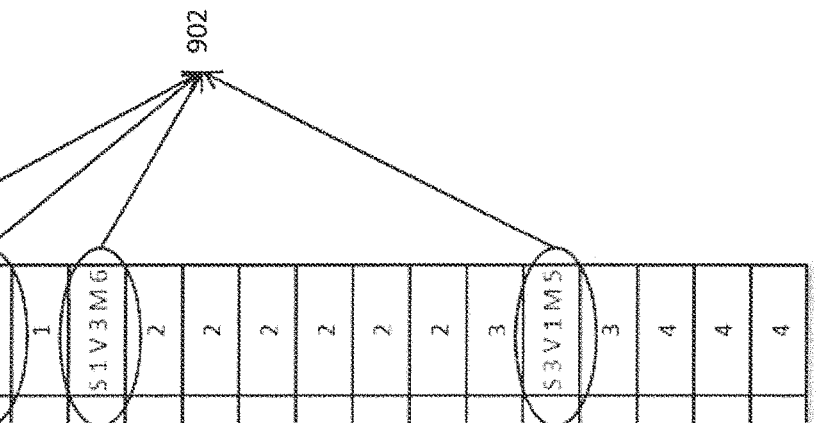
FIG. 9 comprises a diagram as configured in accordance with various embodiments of these teachings.

Referring now to FIG. 9, a display showing only micro-clusters that are important is described. Low performing important stores 902 are also identified in this chart. The chart shows information concerning stores including the sales cluster, velocity bucket, micro-cluster. YoY growth, Category share of department, consumer segmentation score, importance score, focus, and the modular cluster (either a sales cluster or micro-cluster) to which a store is assigned.

Figure 10:
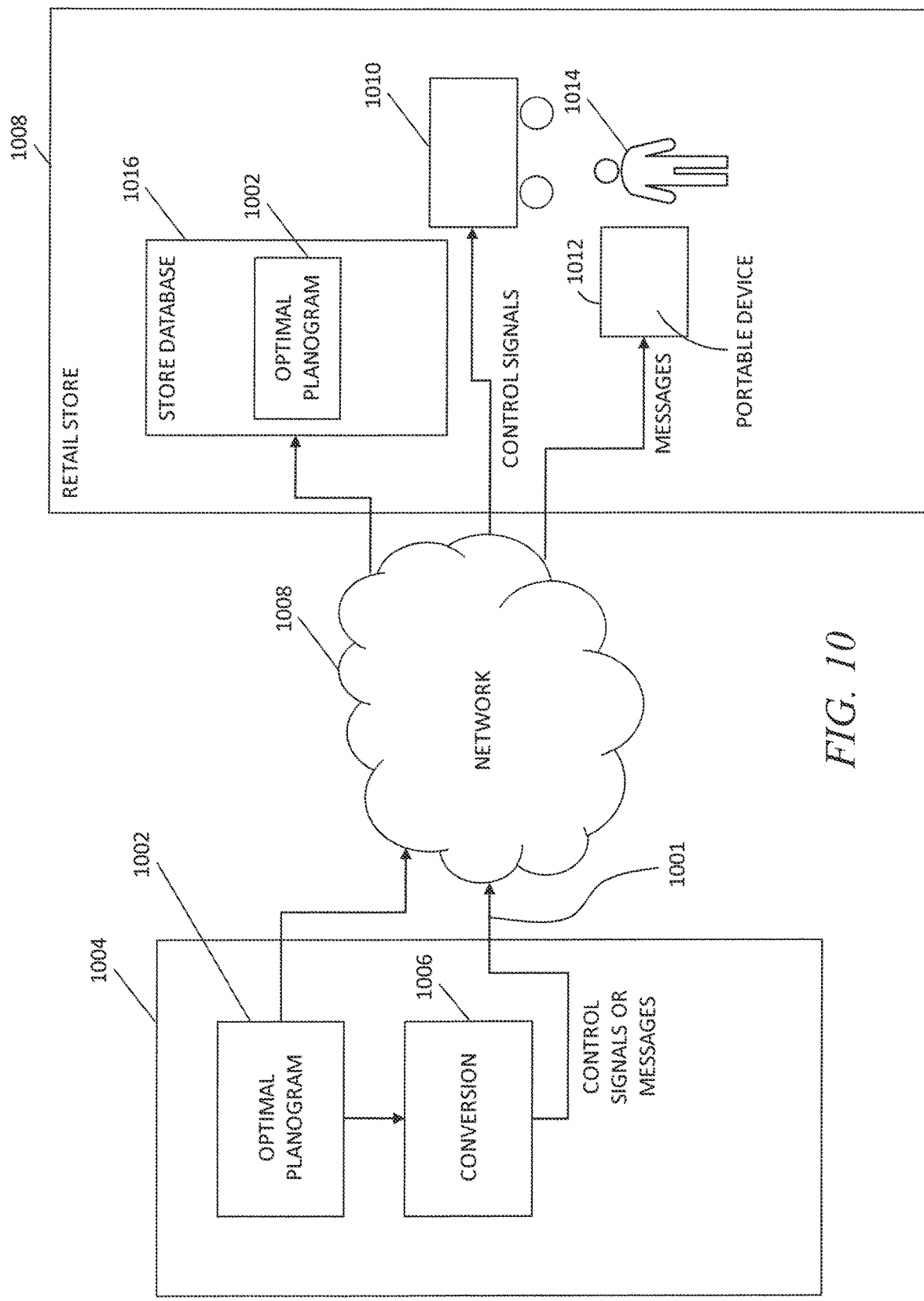
FIG. 10 comprises a diagram as configured in accordance with various embodiments of these teachings.

Referring now to FIG. 10, one example of the implementation of actions is described. In this example, an optimal planogram 1002 has been determined at a central processing center 1004. The optimal planogram 1002 is converted by an implementation process 1006 into control signals or messages that implement the planogram 1002. For example, electronic messages or electronic control signals 1001 may be formed that instruct a human or robot to move products to certain locations in a retail store 1008, re-arrange shelving in the retail store 1008, or perform any other action in the retail store 1008 needed to implement the product placement plan described in the planogram 1002. The signals 1001 are transmitted across a communication network 1008 to a robot 1010 to implement the planogram 1002 or to a user device 1012 (e.g., smartphone, tablet, personal computer, or laptop) of a human 1014 so that the human 1014 can implement the planogram 1002.

In examples, the robot 1010 may examine the planogram and determine how to stock the shelves of a retail store to implement the planogram 1002. For example, the robot 1010 may go to a backroom or storeroom to obtain products for shelving purposes. The robot 1010 may also be configured to move products already present on the shelves, or adjust shelving to implement the planogram 1002.

The planogram 1002 may also be downloaded to a database 1016 and stored at the database 1016. The planogram 1002 can also be implemented from the database 1016. That is, the planogram 1002 may be downloaded to the database 1016, and control signals or messages formed at the retail store 1008 instead of at the central processing center 1004.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system that determines and implements optimal planograms in retail stores to maximize store performance, the system comprising:
  a plurality of retail stores;
  an electronic network;
  shelving units disposed in each of the plurality of retail stores, the shelving units configured to display products to customers;
  a plurality of sales entry devices that are configured to collect sales data at the plurality of retail stores;

a transceiver circuit disposed at a central processing center, the transceiver circuit being configured to receive the sales data, and additionally receive product characteristic data for products stocked in the plurality of retail stores;

a first database disposed at the central processing center, the first database configured to store the sales data and the product characteristic data;

a control circuit disposed at the central processing center, the control circuit being coupled to the transceiver circuit and the first database, the control circuit being configured to:

form initial sales clusters of retail stores from the plurality of retail stores according to one of a plurality of algorithms using the product characteristic data and the sales data, each of the initial sales clusters including a subset of the plurality of retail stores, formation of the initial sales clusters of retail stores from the plurality of retail stores being effective to maximize the compactness of the initial sales clusters and to minimize the total number of initial sales clusters, each of the initial sales clusters being assigned an initial planogram;

divide each initial sales cluster into a plurality of velocity buckets, each of the velocity buckets relating to a velocity of product sales according to the sales data for retail stores in the velocity bucket;

subsequently divide each velocity bucket into a plurality of micro-clusters, the micro-clusters being defined according to demographic information or store characteristic information;

using the sales data, determine an importance score and a performance score for each of the micro-clusters, the importance score indicating the relative ranking a micro-cluster compared to other micro-clusters in accomplishing store performance goals, and the performance score indicating the absolute operational performance of the retail stores in the micro-cluster in accomplishing the store performance goals;

selectively determine an optimal sales cluster and a corresponding optimal planogram for each retail store in each micro-cluster based upon the importance score and the performance score, the optimal planogram being selected to maximize store performance;

determine and implement an action based upon the optimal planogram, the action including manually and by automated devices stocking the shelving units at the stores according to the optimal planogram, the stocking being accomplished at least in part by moving or rearranging products within the retail stores to the shelving units in the retail stores, the action also including reconfiguring at least one of the shelving units in at least one of the plurality of retail stores;

wherein the performance score indicates that the micro-cluster is generally ideal in performance, over-performing, under-performing, or at risk of under-performing, and the importance score indicates that the micro-cluster is significant relative to other micro-clusters or not significant relative to other micro-clusters;

wherein the importance score is associated with a weighted average of changes of store traits;

wherein the importance score is further associated with a variable importance;

wherein when a micro-cluster is under-performing and significant, the optimal planogram is a newly created planogram;

wherein when a micro-cluster is over-performing and not significant, then the optimal planogram is the same as an original modular planogram of the sales cluster;

wherein the controller is configured to cause the display of significant micro-clusters, importance scores associated with each of the significant micro-clusters, and the performance scores associated with each of the significant micro-clusters;

wherein the optimal planogram is sent from the control circuit to a second database at each retail store of the plurality of retail stores via the electronic network;

wherein control signals that control the automated devices are formed based upon the optimal planogram as stored in the second database;

wherein the control signals assign different tasks to different automated devices.

2. The system of claim 1, wherein the store performance goal is one or more of: year-over-year sales trends, year-over-year category growth, market or customer penetration, or category share of a department.

3. The system of claim 1, wherein the performance score and the importance score reflect differences between a micro-cluster average and a national average.

4. The system of claim 1, wherein the optimal sales cluster is a newly created sales cluster with a newly created planogram.

5. The system of claim 1, wherein the optimal sales cluster is one of the initial sales clusters with the initial planogram for the initial sales cluster.

6. The system of claim 1, further comprising rendering profile information concerning the initial sales clusters or the micro-clusters at a user interface.

7. The system of claim 1, wherein the importance score is a weighted average of the absolute relative changes of store traits from a cluster average and a national average multiplied by a variable importance.

8. The system of claim 1, wherein the variable importance is obtained from a Random forest model.

9. The system of claim 1, wherein the algorithms are selected from the group consisting of: a K-means algorithm, a K-medoids algorithm, a Ward's Clustering algorithm, and a Convex Clustering algorithm.

10. A method that determines and implements optimal planograms in retail stores to maximize store performance, the method comprising:

providing a plurality of shelving units disposed in each of the plurality of retail stores, the shelving units configured to display products to customers;

collecting sales data at a plurality of sales entry devices at the plurality of retail stores;

receiving the sales data and product characteristic data for products stocked in the plurality of retail stores at a central processing center;

storing the sales data and the product characteristic data at a first database at the central processing center;

a control circuit disposed at the central processing center, forming initial sales clusters of retail stores from the plurality of retail stores according to one of a plurality of algorithms using the product characteristic data and the sales data, each of the initial sales clusters including a subset of the plurality of retail stores, the forming of the initial sales clusters of retail stores from the plurality of retail stores being effective to maximize the compactness of the initial sales clusters and to minimize the total number of initial sales clusters, each of the initial sales clusters being assigned an initial planogram, dividing each initial sales cluster into a plurality of velocity buckets, each of the velocity buckets relating to a velocity of product sales according to the sales data for retail stores in the velocity bucket, subsequently dividing each velocity bucket into a plurality of micro-clusters, the micro-clusters being defined according to demographic information or store characteristic information, using the sales data, determining an importance score and a performance score for each of the micro-clusters, the importance score indicating the relative ranking a micro-cluster compared to other micro-clusters in accomplishing store performance goals, and the performance score indicating the absolute operational performance of the retail stores in the micro-cluster in accomplishing the store performance goals, selectively determining an optimal sales cluster and a corresponding optimal planogram for each retail store in each micro-cluster based upon the importance score and the performance score, the optimal planogram maximizing store performance, and determining and implementing an action based upon the optimal planogram, the action including manually and by automated devices stocking the shelving units of the stores according to the optimal planogram, the stocking being accomplished at least in part by moving or rearranging products within the retail stores to the shelving units in the retail stores, the action also including reconfiguring at least one of the shelving units in at least one of the plurality of retail stores;

wherein the performance score indicates that the micro-cluster is ideal in performance, over-performing, under-performing, or at risk of under-performing, and the importance score indicates that the micro-cluster is significant relative to other micro-clusters or not significant relative to other micro-clusters;

wherein the importance score is associated with a weighted average of changes of store traits;

wherein the importance score is further associated with a variable importance;

wherein when a micro-cluster is under-performing and significant, the optimal planogram is a newly created planogram;

wherein when a micro-cluster is over-performing and not significant, then the optimal planogram is the same as an original modular planogram of the sales cluster;

wherein the controller is configured to cause the display of significant micro-clusters, importance scores associated with each of the significant micro-clusters, and the performance scores associated with each of the significant micro-clusters;

wherein the optimal planogram is sent from the control circuit to a second database at each retail store of the plurality of retail stores via the electronic network;

wherein control signals that control the automated devices are formed based upon the optimal planogram as stored in the second database;

wherein the control signals assign different tasks to different automated devices.

11. The method of claim 10, wherein the store performance goal is one or more of: year-over-year sales trends, year-over-year category growth, market or customer penetration, or category share of a department.

12. The method of claim 10, wherein the performance score and the importance score reflect differences between a micro-cluster average and a national average.

13. The method of claim 10, wherein the optimal sales cluster is a newly created sales cluster with a newly created planogram.

14. The method of claim 10, wherein the optimal sales cluster is one of the initial sales clusters with the initial planogram for the initial sales cluster.

15. The method of claim 10, further comprising rendering profile information concerning the initial sales clusters or the micro-clusters at a user interface.

16. The method of claim 10, wherein the importance score is a weighted average of the absolute relative changes of store traits from a cluster average and a national average multiplied by a variable importance.

17. The method of claim 10, wherein the variable importance is obtained from a Random forest model.

18. The method of claim 10, wherein the algorithms are selected from the group consisting of: a K-means algorithm, a K-medoids algorithm, a Ward's Clustering algorithm, and a Convex Clustering algorithm.

* * * * *